US007428781B2

(12) United States Patent
Wickhart

(10) Patent No.: US 7,428,781 B2

(45) Date of Patent: Sep. 30, 2008

(54) METHOD AND APPARATUS FOR PERFORMING OVERHEAD CRANE RAIL ALIGNMENT SURVEYS

(76) Inventor: John C Wickhart, 2151 California St. NW., Apartment #202, Washington, DC (US) 20008-1838

( * ) Notice: Subject to any disclaimer, the term of this patent is extended or adjusted under 35 U.S.C. 154(b) by 0 days.

(21) Appl. No.: 11/656,551

(22) Filed: Jan. 23, 2007

(65) Prior Publication Data

US 2007/0171434 A1 Jul. 26, 2007

Related U.S. Application Data

(60) Provisional application No. 60/760,924, filed on Jan. 23, 2006.

(51) Int. Cl.
*G01B 11/14* (2006.01)
*B66C 13/46* (2006.01)

(52) U.S. Cl. .......................... 33/286; 33/287; 33/1 BB

(58) Field of Classification Search .................. 33/227, 33/228, 286, 287, 293, 645, 1 Q, 1 BB; 269/71, 269/73, 74, 312; 212/71, 73, 74, 312
See application file for complete search history.

(56) References Cited

U.S. PATENT DOCUMENTS

| | | | | |
|---|---|---|---|---|
| 2,471,513 | A | 5/1949 | Bogle | |
| 3,267,794 | A * | 8/1966 | Howe | 356/153 |
| 3,793,739 | A * | 2/1974 | Hoffman et al. | 33/286 |
| 4,509,431 | A | 4/1985 | Laskowski | |
| 5,048,703 | A | 9/1991 | Tax et al. | |
| 5,331,745 | A | 7/1994 | Jager | |
| 5,343,739 | A | 9/1994 | Curry | |
| 5,491,549 | A | 2/1996 | Wichner et al. | |
| 6,040,903 | A * | 3/2000 | Lysen et al. | 356/153 |
| 6,057,777 | A | 5/2000 | Dunne et al. | |
| 6,067,024 | A | 5/2000 | Eckstine et al. | |
| 6,377,186 | B1 | 4/2002 | Dunne et al. | |
| 6,415,208 | B1 | 7/2002 | Pojda | |
| 2002/0066390 | A1 | 6/2002 | Davis | |

(Continued)

FOREIGN PATENT DOCUMENTS

DE 220396 A1 * 3/1985

(Continued)

OTHER PUBLICATIONS

"Runway Surveys," PCINorthwest.com, http://www.pcinorthwest.com/index_015.htm, 1 page, printed from the Internet Jul. 13, 2005.

(Continued)

*Primary Examiner*—R. A. Smith
(74) *Attorney, Agent, or Firm*—Law Offices John Gibson Semmes

(57) ABSTRACT

A method and apparatus for conducting an overhead crane runway system survey uses a survey apparatus that is alternately pushed or pulled by an overhead crane. The survey apparatus, having a wheeled carriage, includes survey sighting targets, e.g., prisms, that are visible to survey personnel on the ground. XYZ data is there collected and a rail alignment profile, a rail elevation profile, a rail span profile, and/or a crane skew profile may be generated. The data and profiles generated may reviewed to ascertain whether the overhead rails conform to alignment specifications. Further, crane skew data may be reviewed to determine whether the crane itself may be misaligned.

22 Claims, 13 Drawing Sheets

U.S. PATENT DOCUMENTS

| | | | |
|---|---|---|---|
| 2005/0111012 A1 | | 5/2005 | Waisanen |

FOREIGN PATENT DOCUMENTS

| | | | | |
|---|---|---|---|---|
| JP | 61230021 | A | * | 10/1986 |
| JP | 08310787 | A | * | 11/1996 |
| JP | A-2004-264099 | | | 9/2004 |
| JP | A-2004-317304 | | | 11/2004 |
| WO | WO 9625646 | A1 | * | 8/1996 |
| WO | WO 2005100913 | A2 | * | 10/2005 |

OTHER PUBLICATIONS

"Laser Alignment," LanceCrane.com, http://www.lancecrane.com/Laser%20Alignment.htm, 1 page, printed from the Internet Jul. 13, 2005.

* cited by examiner

METHOD AND APPARATUS FOR PERFORMING OVERHEAD CRANE RAIL ALIGNMENT SURVEYS

CROSS-REFERENCE TO RELATED APPLICATION

This application claims priority to U.S. Provisional Application No. 60/760,924 filed on Jan. 23, 2006, the disclosure of which, including all materials incorporated therein by reference, is incorporated herein by reference in its entirety.

BACKGROUND

1. Field of Invention

This invention relates to surveying an existing overhead crane runway system to determine its straightness, span and elevation.

2. Description of the Related Art

An exemplary overhead crane, with which exemplary embodiments of the described rail survey carriage, or survey unit, and rail survey data collection methods may be used, is shown in FIG. 13. As shown in FIG. 13, such a traveling overhead crane 1300 may span a distance between two crane rails 1302, each crane rail supported by a crane girder 1304, and each crane girder supported by a plurality of support columns 1306.

Overhead crane 1300 may contact each of crane rails 1302 with an end truck 1308. Each end truck may include two or more wheels 1316 that contact crane rail 1302. For example, each end truck 1308 shown in FIG. 13 includes four end truck wheels 1316. The leading/trailing ends of each end truck 1308 is terminated with a rail sweep 1314.

Overhead crane 1300 may further include a trolley 1318 that travels between the two respective end trucks1308 on a pair of bridge rails 1320, each bridge rail supported by a bridge girder 1319. Trolley 1318 may further include one or more hoisting mechanisms 1322, each supporting a load hook 1324 which may be raised and lowered by each of the respective hoisting mechanisms to raise and lower cargo. Use of hoisting mechanisms 1322 to raise and lower cargo, coupled with the ability of trolley 1318 to travel back and forth between the two respective end trucks 1308 on bridge rails 1320, coupled with the ability of overhead crane 1300, as a whole, to travel the length of crane rails 1302, allows crane operators to move cargo between any two locations on the loading dock between crane rails 1302. Operation of the crane may be controlled by a crane operator located in a control cab 1326.

Overhead cranes, as described above, are used in material handling factories and warehouses around the world to load and unload millions of tons of cargo daily and are crucial to the daily operations performed at each of these respective factories and warehouses. Due to the large scale of such overhead cranes and the heavy loads typically transported by the cranes, proper alignment of crane rails and crane wheels is crucial to their safe and efficient operation, and hence crucial to the daily operations of each business in which they are used.

Alignment standards for crane rails are outlined in the Crane Manufacturers Association of America's specification 70 and AISE technical report #13. Many types of rail surveys involve time-consuming methods that require the rail to be locked out (i.e., power to the hot rail turned off) and survey personnel to walk the length of the runway.

Although alignment of the crane rails is important, other factors, such as positioning of crane end truck wheels parallel to their respective crane rails and/or assuring that drive motor output provided to the respective end trucks is equivalent, are also important. Imbalances in motor output to the respective end trucks can cause crane skew even though the crane rails themselves are within tolerance guidelines. These imbalances result in wear on the rail and crane wheels, both of which are costly to repair. Hence, a safe method to quickly and accurately collect rail survey data and to find the root cause of misalignment problems would be very beneficial.

Previous methods of rail surveying have involved using piano wire for straightening sections of rail. This method, when used in conjunction with a tape measure to measure the span between crane rails, is not very accurate and is extremely time consuming. Another common method requires setting a transit on the rail while survey personnel walk the length of the rail, stopping at various points to take readings. Whereas this is a more accurate approach for determining the straightness of individual crane rails, determining the span between crane rails is still dependent on the use of a tape measure. For measurement of crane rail elevation, yet another instrument is required for set-up on the rail. With two exceptions, the prior art for rail surveying refers primarily to techniques for use on train tracks and elevation tracks which are not applicable for use with respect to overhead cranes.

One exception is found in U.S. Patent Application Publication No. U.S. 2005/0111012, filed Nov. 25, 2003 by Steven K. Waisanen and published May 26, 2005 (Waisanen), which describes a laser survey device, which uses a remotely operated laser to perform a runway survey.

The laser survey device described in Waisanen includes a stationary component, that includes a self-leveling laser, and a mobile component, that includes a screen and an image capture device. In operation, the stationary self-leveling laser emits a beam of laser light towards the screen of the mobile component as the mobile component travels along the length of a crane rail. As the mobile screen travels along the length of the crane rail, the location of impact of the laser light on the mobile screen changes depending on movement of the mobile screen within a plane perpendicular to the steady beam of laser light emitted by the stationary, self-leveling laser. The image capture device captures and transmits to a remote computer information related to the location of impact of the laser light on the mobile screen. The remote computer uses the received information to assess the alignment of the crane rail.

Although Waisanen, at paragraphs [0024]-[0025] and in claim 16, indicates that the device can be modified for operation on a variety of crane rail configurations, Waisanen does not provide any details related to such alternate embodiments. For example, the detailed description and drawings depict only a device suited for use with a bottom-running crane rail configuration.

U.S. Pat. No. 6,415,208, filed Feb. 28, 2000, by Romuald Pojda, and issued Jul. 2, 2002 (Pojda), describes a laser-based survey device that is very similar, in both design and operation, to the laser-based survey device described in Waisanen. However, the device described in Pojda is configured to collect alignment data for top-rail crane rail configuration.

Although the devices described in Waisanen and Pojda may be used to collect alignment information for a single crane rail, the systems suffer from serious deficiencies. For example, both systems rely on a complex combination of electronics and some device embodiments are self-propelled. Such complex devices, mounted in the often harsh operational environment of some facilities, are likely to fail, resulting in lost operational capability, a need for specialized repairs, and, possibly, down-time for the crane itself.

Further, the devices described in Waisanen or Pojda are not capable of providing crane operators with sufficient information to quickly and accurately identify the root cause of misalignment problems within an overhead crane system. For example, the devices described in Waisanen and Pojda are capable of providing rail alignment information only. Neither the Waisanen device nor the Pojda device is capable of providing information related to span alignment, or elevation. Further, neither device is capable of providing timely information related to crane skew which may be used to identify and correct imbalances in the drive motors so as to avoid operating conditions in which the crane end truck wheels are not positioned parallel to the crane rails, and thereby avoid stresses that may result in misalignment of the respective crane rails, and wear to the crane rail and end truck wheels, all of which are costly to repair.

SUMMARY

Exemplary apparatus and methods are described for conducting a crane runway system survey.

In one exemplary embodiment, a crane rail survey carriage is selectively pulled or pushed along an overhead crane rail by an overhead crane itself. Removable wheels on the rail survey carriage may be contoured to the shape and size of the railhead of the crane rail to keep the apparatus centered on the rail. A specially configured pivot arm, or driving arm, extending from the rail survey carriage to the rail sweep of the overhead crane end truck allows the rail survey carriage to remain plumb, as the crane selectively pushes or pulls the rail survey carriage along the crane rail, despite lateral movement of the crane. A prism, or sighting target, attached to a protruding arm are visible to a survey instrument operator on the ground. Three-dimensional coordinate data (e.g. XYZ coordinate data) may be recorded and used to generate an as-built profile of the rail that may be compared to rail alignment standards. From this data crane skew may also be measured. Accordingly, the advantages of the described method and device include: improved safety for survey personnel when performing overhead crane rail surveys, improved speed and accuracy of overhead crane rail surveys; improved data resulting from an overhead crane rail survey that may be used, not only to produce rail alignment profiles, but also rail elevation profiles, span profiles and to troubleshoot operational problems related to crane skew; as well as, electronically storable rail survey data that readily supports analysis of historic rail survey data to identify trends and potential problems before they occur. Further advantages will become apparent from a study of the following drawings and descriptions.

BRIEF DESCRIPTION OF THE DRAWINGS

Exemplary embodiments will be described in detail below with reference to the drawings, in which like reference numerals designate like parts, and wherein.

DETAILED DESCRIPTION OF EMBODIMENTS

The described rail survey carriage may be used in surveying an overhead crane rail for straightness, span and elevation. Further, the survey information collected may be used to determine whether or not an overhead crane, per se, is skewed at any measurement point. Embodiments of the described rail survey carriage may be used in conjunction with a combination electronic transit (ET)/electronic distance measuring (EDM) device, or ET/EDM device, commonly referred to as a total station, positioned on the loading dock.

Figure 12:
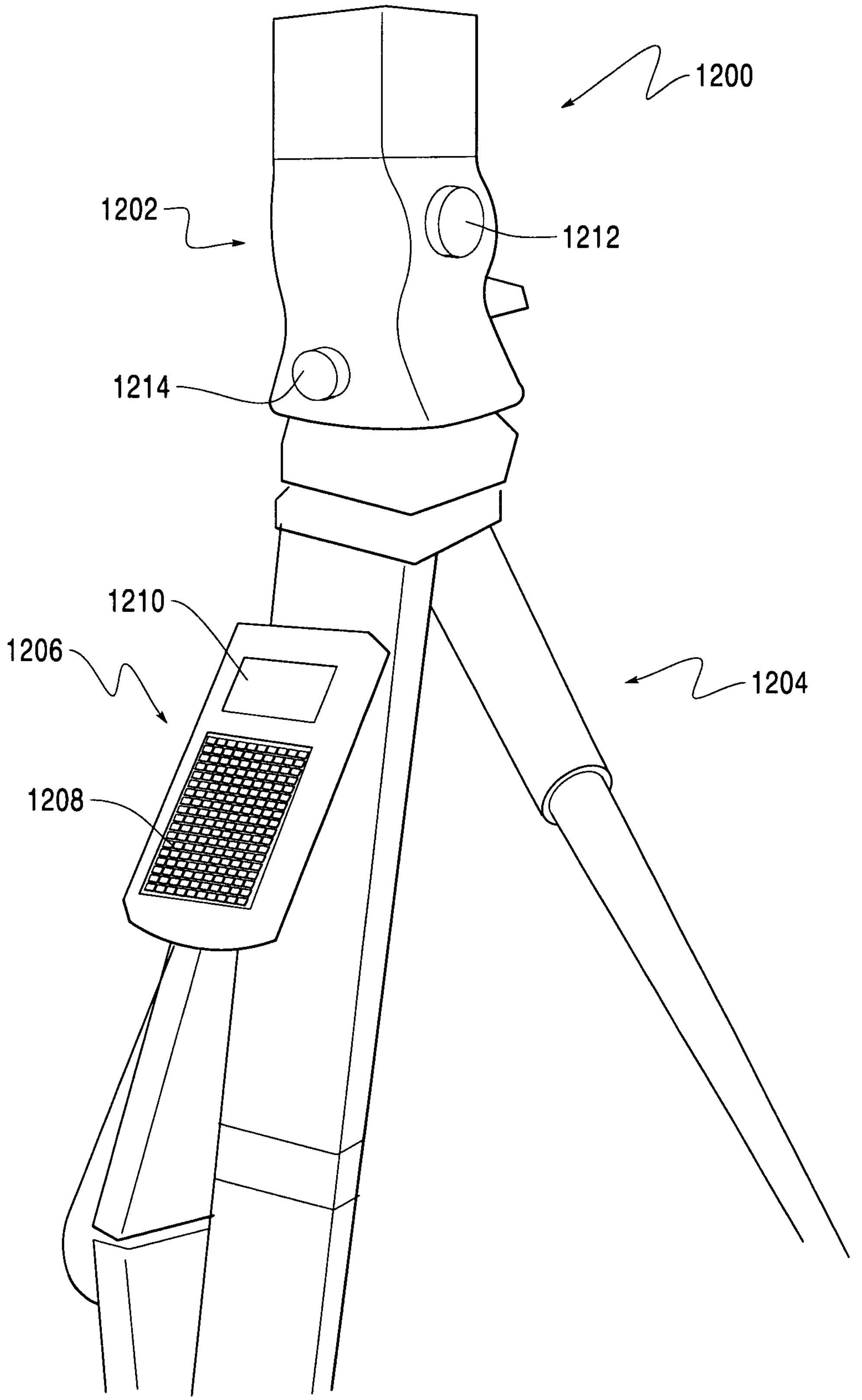
FIG. 12 is a view in schematic perspective of an exemplary, portable, combination electronic transit and electronic distance measuring (ET/EDM) device used with exemplary embodiments of the rail survey carriage shown in FIGS. 1-8.

FIG. 12 is a view in schematic perspective of an exemplary portable ET/EDM device 1200 which may be used with exemplary embodiments of the described rail survey carriage described below with respect to FIGS. 1-8.

As shown in FIG. 12, ET/EDM device 1200 may include an electronic transit 1202, with electronic distance measuring capabilities, mounted on a tripod 1204, and an attached calculating device 1206 with a keypad 1208 and a display 1210.

An ET/EDM device one may be used to determine angles and distances from the ET/EDM device to points to be surveyed. With the aid of trigonometry, the angles and distances determined with the ET/EDM may be used to calculate the coordinates of actual position coordinates (e.g., X, Y, and Z coordinates and/or or Northing, Easting and Elevation) of sighted points, or a position of a surveyed point, in absolute terms. The coordinate information collected may be downloaded from the ET/EDM device to a computer and application software may be used to generate a map of the surveyed area. Some ET/EDM devices may include a GPS interface.

For example, a standard transit is basically a telescope with cross-hairs for sighting a target; the telescope is attached to scales for measuring the angle of rotation of the telescope (normally relative to north as 0 degrees) and the angle of inclination of the telescope (relative to the horizontal as 0 degrees). After rotating the telescope to aim at a target, one may read the angle of rotation and the angle of inclination from a scale. The electronic transit provides a digital read-out of those angles instead of a scale. Such an approach is both more accurate and less prone to errors arising from interpolating between marks on the scale or from mis-recording. Further, readout is continuous, so angles may be reviewed at any time.

The electronic distance measuring portion of the ET/EDM device measures the distance from the instrument to its target. The EDM may send out an infrared beam which is reflected back to the unit, and the unit may use timing measurements to calculate the distance traveled by the beam. For better accuracy, the EDM requires that the target be highly reflective, and a reflecting prism is normally used as the sighting target. The reflecting prism may be a cylindrical device about the diameter of a soft-drink can and about 10 cm. in height.

ET/EDM calculating device 1206 with a keypad 1208 and a display 1210 may be used determine the locations of points sighted. The calculator may perform the trigonometric functions needed to calculate the location of any point sighted based on the angle and distance information recorded for the sighted point. Exemplary ET/EDM devices may also include data recorders. The raw survey data (angles and distances) and/or the coordinates of points sighted may be recorded, along with some additional information (usually codes to aid in relating the coordinates to the points surveyed). The data thus recorded can be directly downloaded to a computer at a later time. The use of a data recorder further reduces the potential for error and eliminates the need for a person to record the data in the field.

The determination of angles and distance are essentially separate actions. First, the ET/EDM operator may aim the telescope at a prism positioned at a point to be sighted. Then, once the telescope has been aimed, the angles are determined, and the EDM may be used to determine a distance to the target.

An ET/EDM device may be mounted on tripod 1206 and leveled before use. When an ET/EDM device is set up and power is first turned on, the ET/EDM device may set itself to point to zero degrees (north). There are two adjustment knobs for rotating within the horizontal plane. A first control knob 1212 rotates the telescope to make a sighting, with the readout of angles displaying on display 1210 of calculating device 1206. A second control knob 1214, permits the user to rotate the entire instrument and to keep the current angle unchanged during the process. That effectively re-orients the zero or north setting.

As described in greater detail below, an ET/EDM device may be used in conjunction with exemplary embodiments of the described rail survey carriage to perform surveys of overhead cranes.

Figure 1:
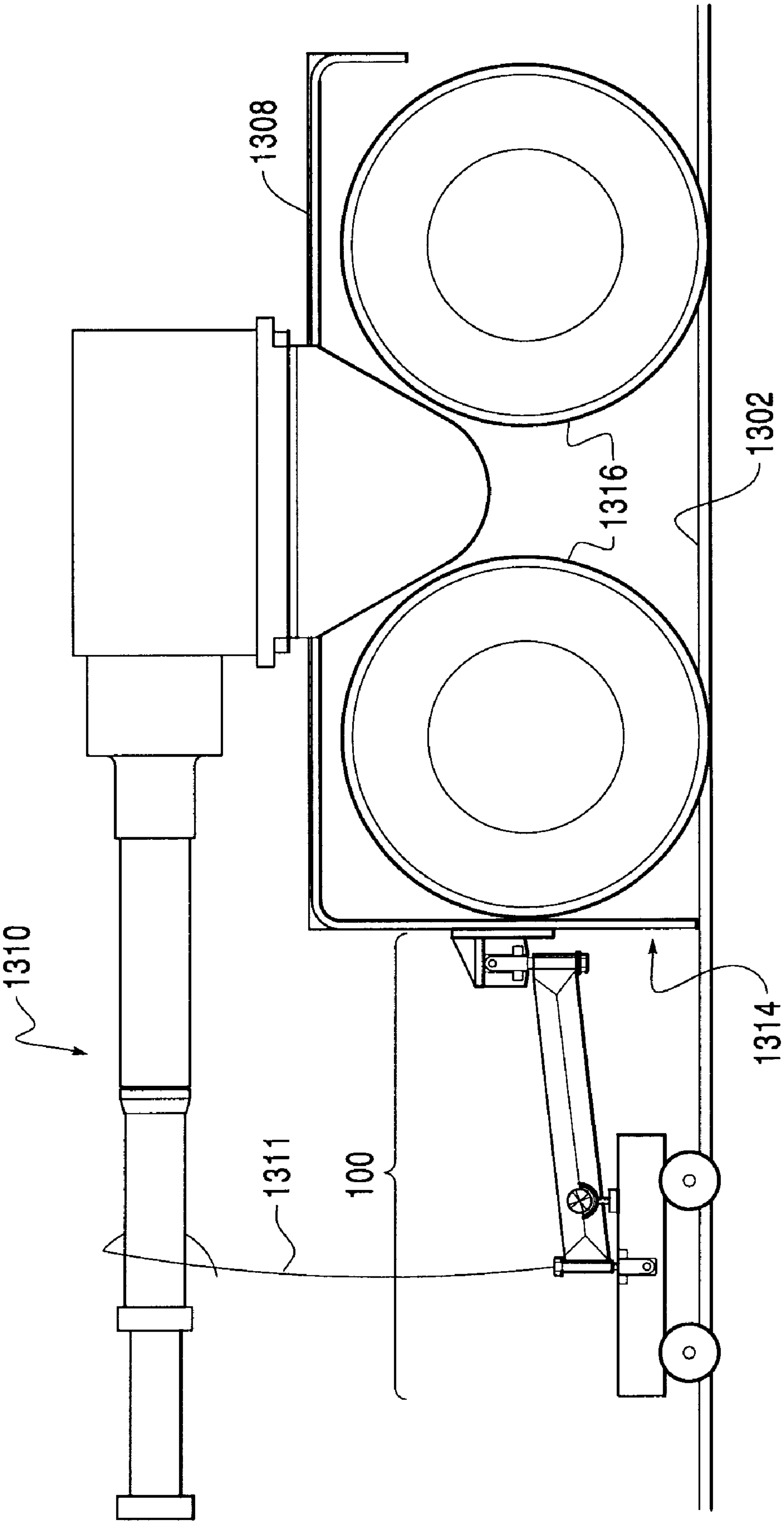
FIG. 1 is a schematic view in side elevation of a first exemplary rail survey carriage attached to a crane rail sweep.
Figure 13:
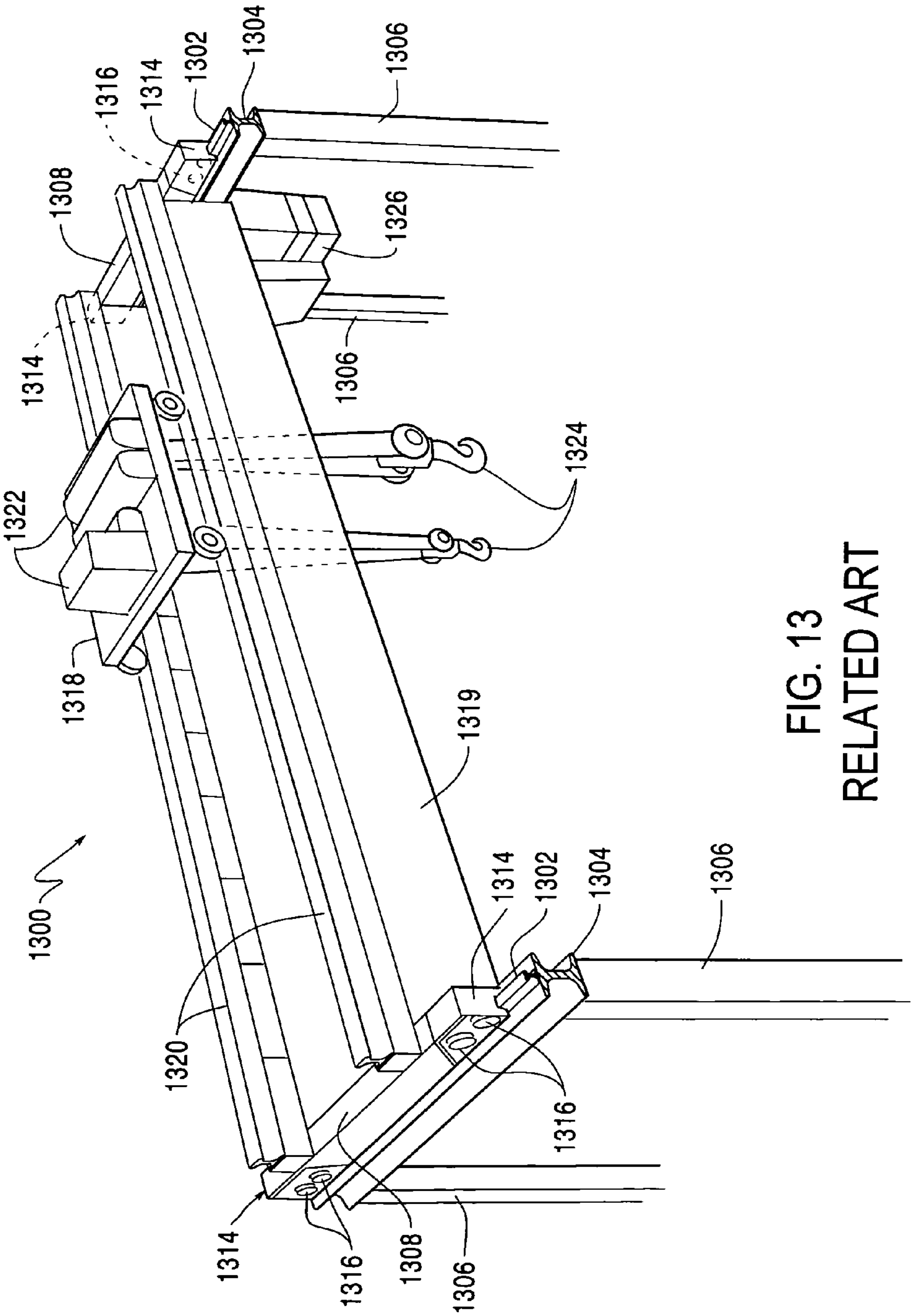
FIG. 13 RELATED ART
FIG. 13 is a view in schematic perspective of an exemplary overhead crane, with which exemplary embodiments of the described rail survey carriage may be used.

FIG. 1 is a schematic view in side elevation of a first exemplary rail survey carriage 100 attached to an exemplary crane rail sweep, as described above with respect to FIG. 13.

Features of overhead crane truck assembly, in FIG. 1, corresponding to like features described above with respect FIG. 13 are identified with like numbers. For example crane rail 1302, end truck 1308, rail sweep 1314, and end truck wheels 1316, are identified with the same numbers used to identify and describe these features with respect to FIG. 13, and therefore, these features will not be further addressed with respect to FIG. 1.

As shown in FIG. 1, overhead crane truck assembly1314 may further include an end truck bumper 1310 which acts as a collision damping mechanism, should overhead crane 1300 exceed its designed operating zone along crane rails 1302 and collide with barriers positioned at each end of crane rails 1302. Further, as shown in FIG. 1, end truck bumper 1310 may also be used as a secure support for carriage safety harness 1311, the other end of which is connected to survey carriage body 102 of rail survey carriage 100. Should rail survey carriage 100 derail from crane rail 1302, carriage safety harness 13 11 is configured to prevent rail survey carriage 100 from falling, thus protecting rail survey carriage 100 from damage, as well as preventing rail survey carriage 100 from causing harm to persons and/or objects below.

Figure 2:
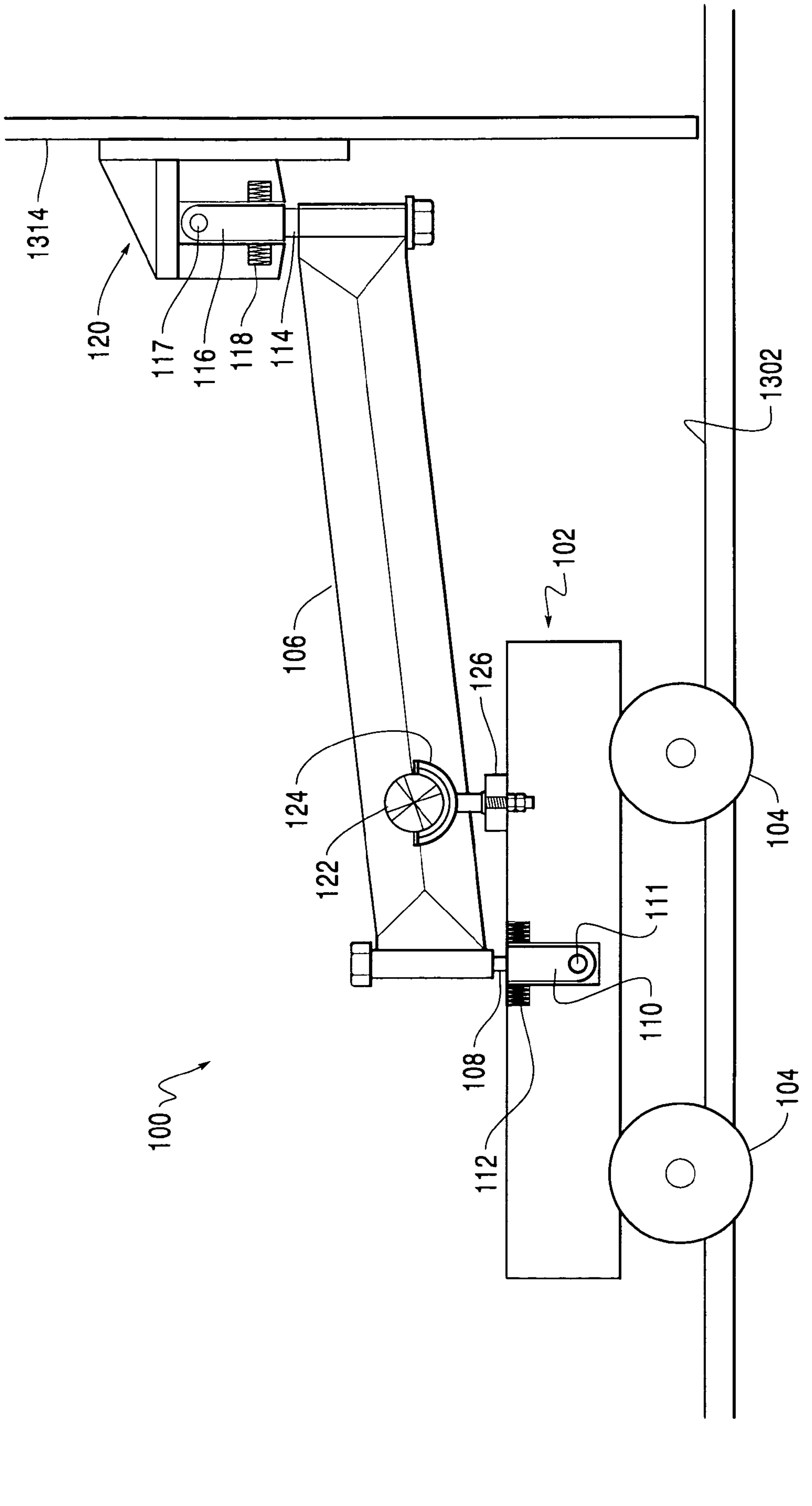
FIG. 2 is an enlarged schematic view in side elevation of the first exemplary rail survey carriage shown in FIG. 1.

FIG. 2 is an enlarged schematic view in side elevation of the first exemplary rail survey carriage 100 shown in FIG. 1. As shown in FIG. 2, rail survey carriage 100 includes a survey carriage body 102 that rides on crane rail 1302 via survey carriage wheels 104. Survey carriage 102 is connected to rail sweep 1314 via survey carriage swivel arm 106, or drive arm, that allows survey carriage 100 to be selectively pushed or pulled by rail sweep 1314 along crane rail 1302.

Survey carriage swivel arm 106 is attach to survey carriage body 102 via survey carriage pivot post 108 which is an extension of survey carriage hinge 110 attached to survey carriage body 102 via survey carriage hinge pin 111. Force applied to survey carriage pivot post 108 from rail sweep 1314 via survey carriage swivel arm 106 to selectively push or pull survey carriage 100 along crane rail 1302, is dampened by survey carriage hinge spring 112.

Survey carriage swivel arm 106 is attached to rail sweep 1314 via sweep bracket 120 which may be bolted to a leading edge of rail sweep 1314 at a position above crane rail 1302. Specifically, survey carriage swivel arm 106 may attach to sweep pivot post 114 which is an extension of sweep hinge 116 attached to sweep bracket 120 via sweep hinge pin 117. Force transferred to survey carriage swivel arm 106, via sweep pivot post 114 from rail sweep 1314 to selectively push or pull survey carriage 100 along crane rail 1302, is dampened by sweep hinge spring 118.

As described in greater detail below, rail survey carriage 100 includes a prism arm 126 that mounts to survey carriage body 102 and extends in a direction generally perpendicular to crane rail 1302, towards the opposite crane rail, into an area above the loading dock serviced by overhead crane 1300. At least one prism 122 is attached via prism support bracket 124 to the end of prism arm 126 extended above the loading dock serviced by overhead crane 1300. As described in greater detail below, any number of additional prisms 122 (e.g., 2, 3, 4, etc.) may be attached to the end of prism arm 126 to facilitate sighting of at least one of the prisms by an ET/EDM.

Figure 3:
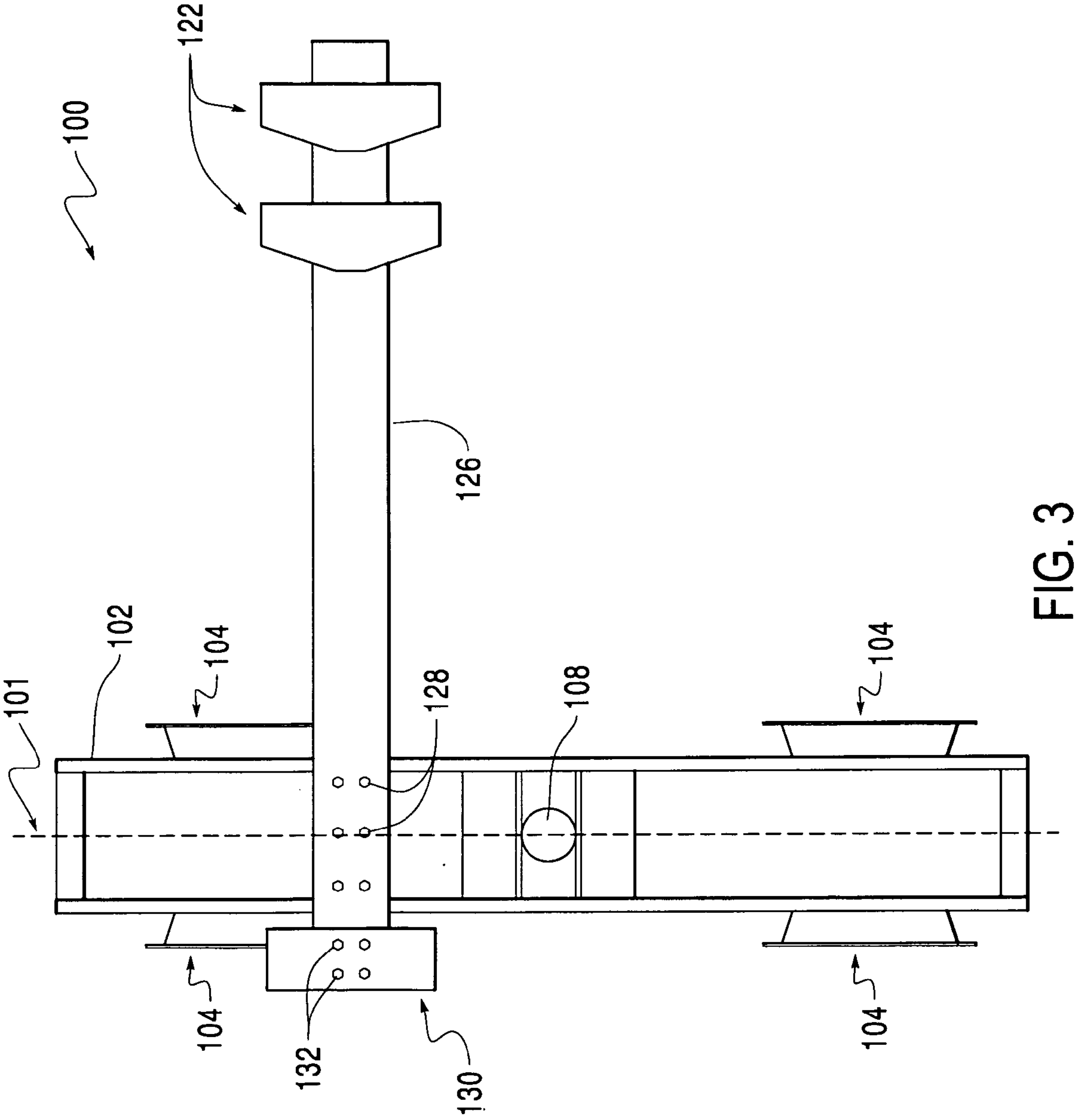
FIG. 3 is a top plan view of the first exemplary rail survey carriage shown in FIG. 1 and FIG. 2.

FIG. 3 is a top plan view of the first exemplary rail survey carriage 100 shown in FIG. 1 and FIG. 2. Features of rail survey carriage 100, in FIG. 3, corresponding to like features described above with respect FIGS. 1-2 are identified with like numbers. These features will not be further addressed with respect to FIG. 3, other than to support introduction of features not previously described.

As shown in FIG. 3, prism arm 126 may further include prism arm counterweights 130 mounted to an end of prism arm 126, opposite the end of prism arm 126 to which prisms 122 are mounted. Prism arm counterweights 130 may be attached to prism arm 126 with a plurality of counterweight bolts 132, while prism arm 126, which supports prism arm counterweights 130 and prisms 122, may be attached to survey carriage body 102 with a plurality of prism arm bolts 128.

Prism arm counterweights 130 are selected to counterbalance the combined weight of prisms 122 and prism arm 126 extending from the opposite side of survey carriage body 102. In this manner the combined weight of prism arm 126, prism support bracket(s) 124, prism(s) 122, prism arm counterweights 130, counterweight bolts 132, and prism arm bolts 128 is centered over centerline 101 of survey carriage body 102 extending in a direction parallel to the length of crane rail 1302. Prism arm 126 extends from the survey carriage body 102 and supports at least one sighting target at a known offset relative to centerline 101 of survey carriage body 102 and hence, a corresponding centerline of the crane rail.

Figure 4:
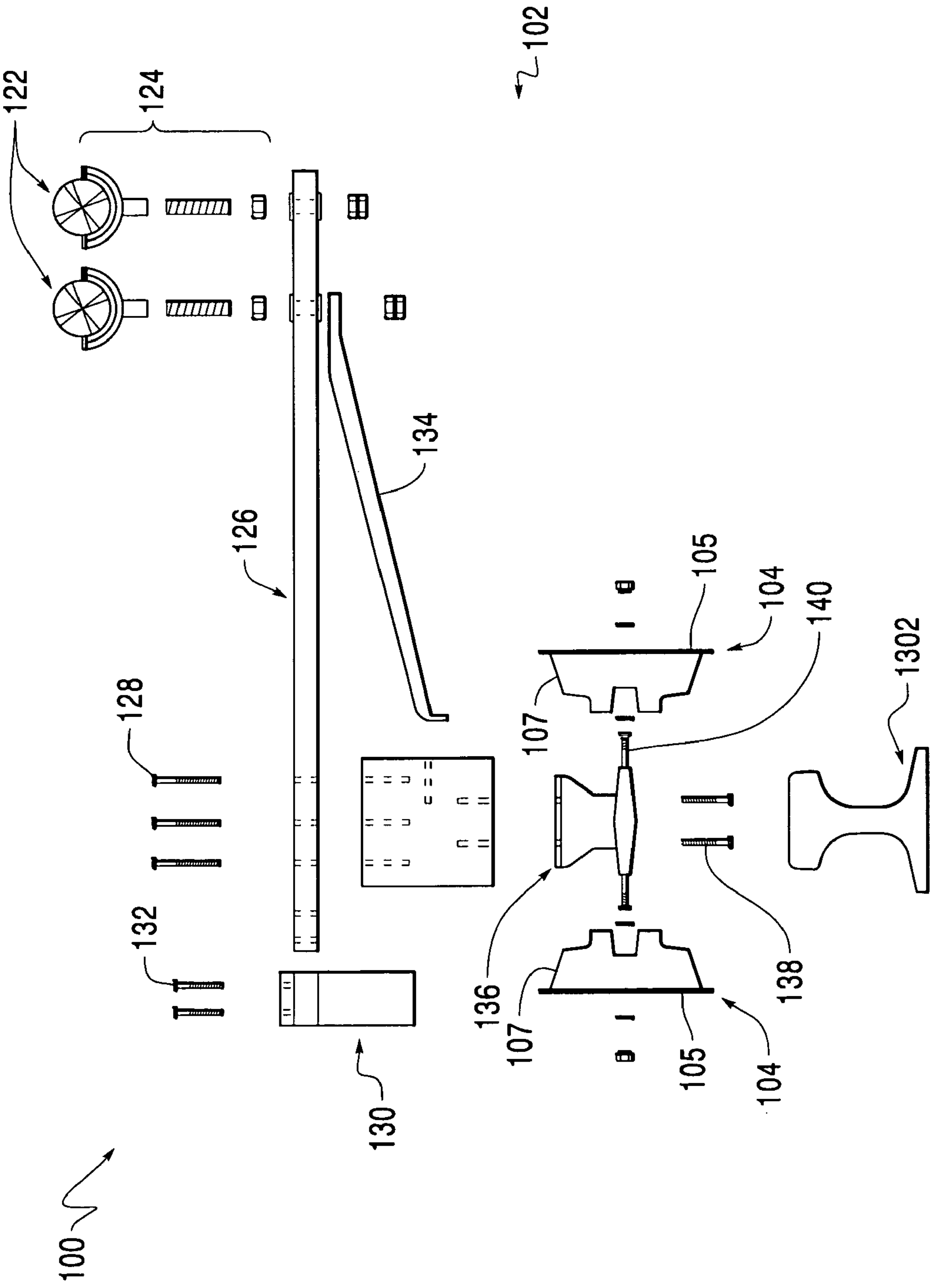
FIG. 4 is an end elevation view of the disassembled parts of the first exemplary rail survey carriage relative to a conventional crane rail.

FIG. 4 is an end elevation view of the disassembled parts of the first exemplary rail survey carriage 100 relative to a conventional crane rail. Features of rail survey carriage 100, in FIG. 4, corresponding to like features described above with respect FIGS. 1-3 are identified with like numbers. These features will not be further addressed with respect to FIG. 4, other than to support introduction of features not previously described.

As shown in FIG. 4, exemplary rail survey carriage 100 may include a survey carriage truck 136 that may be bolted to survey carriage body 102 with truck mounting bolts 138. Survey carriage truck 136 may include a truck axel 140 that extends through survey carriage truck 136, exposing threaded ends of truck axel 140 on either sides of survey carriage truck 136. A survey carriage wheel 104 may be secured to each threaded end of truck axel 140 to form, a survey carriage wheel pair that makes contact with and rides upon crane rail 1302.

Each of survey carriage wheels 104 may include an outer circumferential flange 105. Further, a rail contact surface 107 of each survey carriage wheel 104 with crane rail 1302 may be tapered inward with the widest diameter adjacent to outer circumferential flange 105. As a result of these two features, each survey carriage wheel pair straddles crane rail 1302 and, due to the tapers in the respective rail contact surfaces of each of survey carriage wheels 104, each survey carriage wheel pair, and hence survey carriage body 102, remains centered on crane rail 1302 as rail survey carriage 100 is selectively pushed or pulled along crane rail 1302 by rail sweep 1314.

As shown in FIG. 4, a prism arm support brace 134 may be attached between the side of survey carriage body 102 and the underside of prism arm 126 to provide prism arm 126 with additional structural support.

Figure 5:
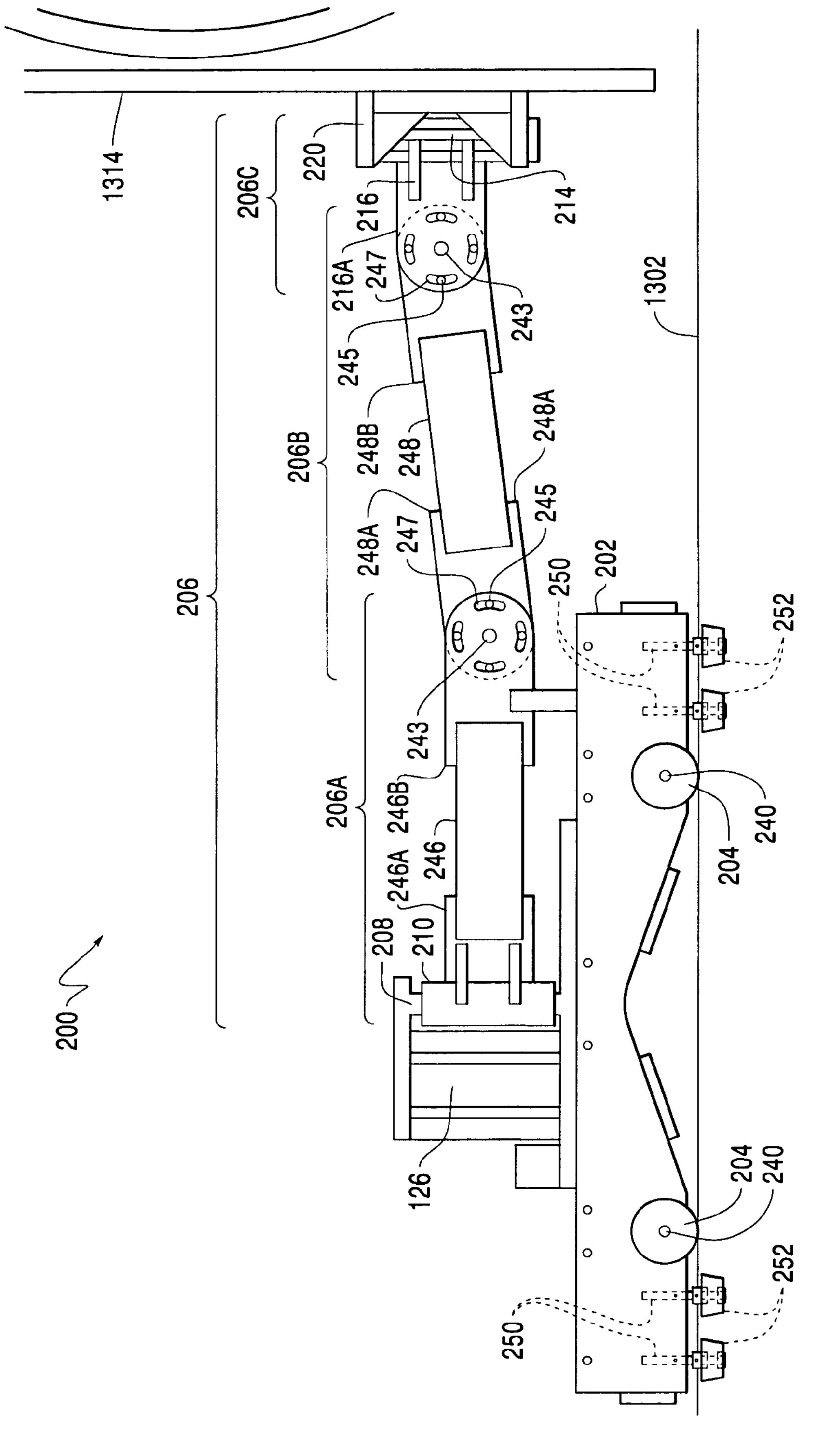
FIG. 5 is a schematic view in side elevation of a second exemplary rail survey carriage.

FIG. 5 is a schematic view in side elevation of a second exemplary rail survey carriage 200. Features of rail survey carriage 200, in FIG. 5, corresponding to like features described above with respect FIGS. 1-4 are identified with like numbers. Features, in FIG. 5, that have been modified from those features described above with respect FIGS. 1-4 are identified with a three digit identifier that begins with a "2," yet retains the second and third digits of their corresponding features described above with respect FIGS. 1-4. Each new feature that is first presented in second exemplary rail survey carriage 200 is identified with a three digit identifier that begins with a "2" in which the second and third digits do not correspond to the second and third digits of a feature described above with respect FIGS. 1-4.

As shown in FIG. 5, second exemplary rail survey carriage 200 is similar to first exemplary rail survey carriage 100 with the exception of several modifications.

For example, rail survey carriage 200 may include a single survey carriage wheel 204 positioned at each end of survey carriage body 202. Each survey carriage wheel 204 may be attached to survey carriage body 202 with single axel 240. In operation, survey carriage wheel 204 rides directly on top of, and does not straddle, crane rail 1302.

To assure that the centerline rail survey carriage 200 remains aligned with the centerline of crane rail 1302, rail survey carriage 200 may include a plurality of carriage stabilizing side-arms 250 each with a carriage stabilizing wheel 252. The wheels 204 and 252 may be made of, for example, polyurethane with a Shore Scale 90A.

During operation, carriage stabilizing wheels 252, on each end and on each side of survey carriage body 202, make tight contact with the side faces of crane rail 1302 to assure that survey carriage body 202 remains centered over the centerline of crane rail 1302. To reduce friction and wear of stabilizing wheel 252, each stabilizing wheel 252 may rotate about an axis formed by each respective stabilizing side-arm 250. Configured in such a manner, stabilizing wheels 252 may roll along the respective side surfaces of crane rail 1302 as rail survey carriage 200 is selectively pushed or pulled by rail sweep 1314.

Similar to rail survey carriage 100 described above with respect to FIGS. 1-4, survey carriage body 202 is connected to rail sweep 1314 via a rigid survey carriage swivel arm 206, or drive arm, that allows survey carriage 200 to be selectively pushed or pulled by rail sweep 1314 along crane rail 1302. However, while rigid survey carriage swivel arm 106, described above with respect to rail survey carriage 100, is a straight, rigid member that cannot be adjusted, rigid survey carriage swivel arm 206 may include several rigid members, rigidly connected together with one or more adjustable joints, thereby allowing the rigid shape of survey carriage swivel arm 206 to be adjusted at the time of installation.

For example, as shown in the exemplary embodiment presented in FIG. 5, survey carriage swivel arm 206 may include three separate sections: a carriage-side section 206A; center section 206B; and sweep-side section 206C. Center section 206B may be joined to each of carriage-side section 206A and sweep-side section 206C via adjustable junction sections, described in greater detail below.

Carriage-side section 206A may include: a survey carriage hinge portion 210; a first rigid plate portion 246A; a rigid metal pipe portion 246; and a second rigid plate portion 246B that includes an adjustable junction section, joined together in the sequence listed above to form a rigid first section of survey carriage swivel arm 206. For example, in one exemplary embodiment, survey carriage hinge portion 210 may be welded to a first end of first rigid plate portion 246A, and a second end of first rigid plate portion 246A and a first end of second rigid plate portion 246B may each be welded into a center slot formed in each respective end of rigid metal pipe portion 246.

Center section 206B may include: a first rigid plate portion 248A, with an adjustable junction section; a rigid metal pipe portion 248; and a second rigid plate portion 248B with an adjustable junction section, joined together in the sequence listed above to form a rigid second section of survey carriage swivel arm 206. For example, in one exemplary embodiment, first rigid plate portion 248A and second rigid plate portion 248B may each be welded into a center slot formed in the respective ends of rigid metal pipe portion 248.

Sweep-side section 206C may include a rigid plate portion 216A, with an adjustable junction section, and a sweep hinge portion 216 joined together in the sequence listed above to form a rigid third section of survey carriage swivel arm 206. For example, in one exemplary embodiment, an end of rigid plate 216A may be welded to sweep hinge portion 216.

The adjustable junction sections described above with respect to rigid plates 246B and 216A may be formed in each respective plate by a center hole 243 and a plurality of holes 245 formed circumferentially about center hole 243. The adjustable junction sections described above with respect to rigid plates 248A and 248B may be formed in each respective plate by a center hole 243 and circumferential slots 247 centered about center hole 243.

By loosely fastening, for example, a bolt through the center hole 243 of the adjustable junction section of rigid plate 246B of carriage-side section 206A, and the center hole 243 of rigid plate 248A of center section 206B, the two adjustable sections may be rotated relative to each in a plane to align the respective circumferential slots of rigid plate 246B with the respective circumferential holes in rigid plate 248A. In this manner, a desired angle between carriage-side section 206A and center section 206B may be determined and then rigidly fixed by tightening bolts passed through each of center holes 243, and the respective circumferential holes 245 aligned with respective circumferential slots 247.

An adjustable junction section connection between rigid plate 248B of center section 206B and rigid plate 216A of sweep-side section 206C may be adjusted and rigidly fixed in the same manner described above. Carriage-side section 206A of survey carriage swivel arm 206 may pivot via survey carriage hinge portion 210 on vertical carriage pivot post 208 mounted to survey carriage body 202. Sweep-side section 206C of survey carriage swivel arm 206 may pivot on vertical sweep pivot post 214 within sweep bracket 220 mounted to rail sweep 1314. In this manner, survey carriage swivel arm 206 provides flexibility with respect to a mounting position of sweep bracket 220 on rail sweep 1314, while also providing sufficient rigidity to allow rail survey carriage 200 to be selectively pushed or pulled by rail sweep 1314.

Figure 6:
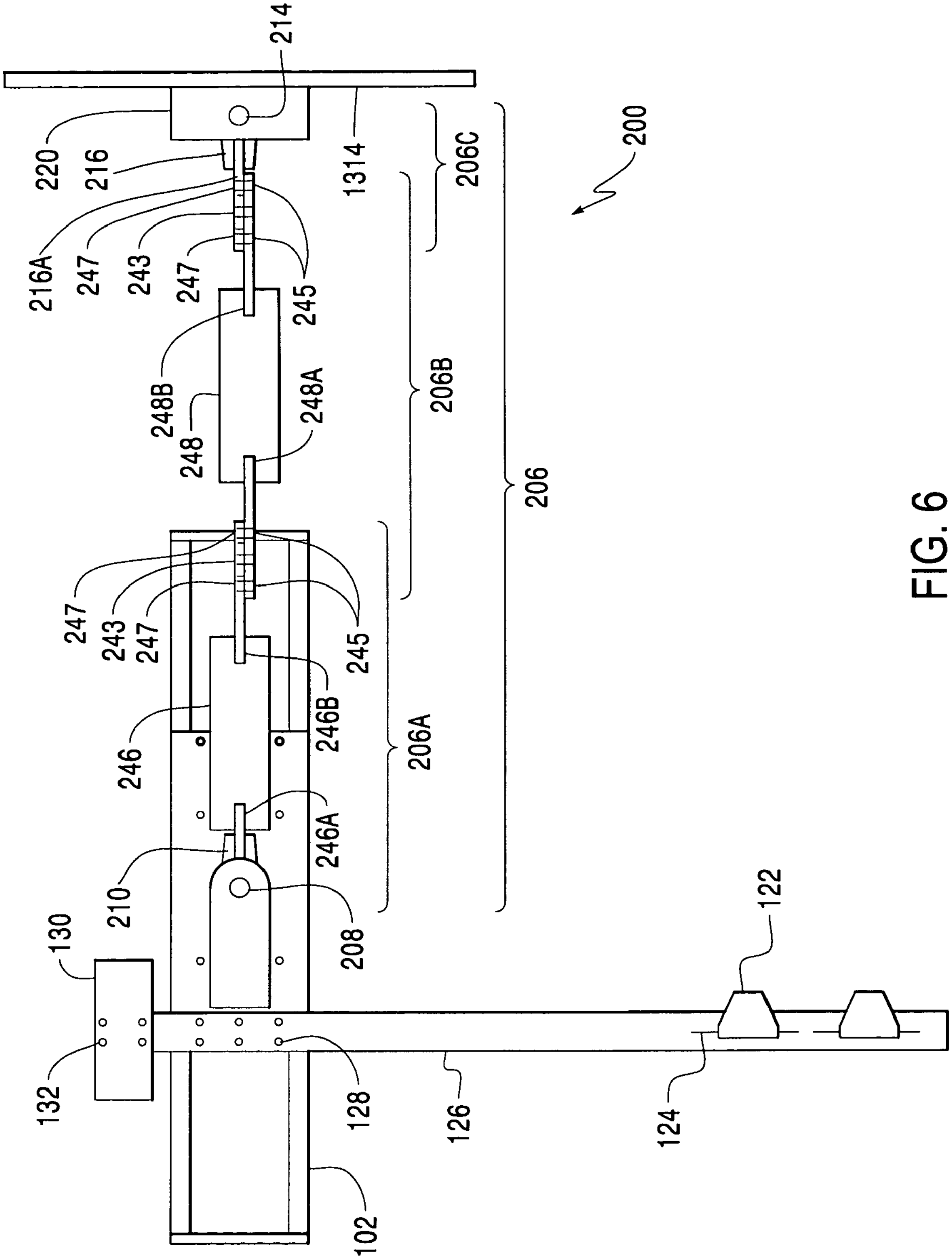
FIG. 6 is a top plan view of the second exemplary rail survey carriage shown in FIG. 5.

FIG. 6 is a top plan view of the second exemplary rail survey carriage shown in FIG. 5. FIG. 6 clearly shows that carriage-side section 206A of survey carriage swivel arm 206 may pivot on vertical carriage pivot post 208 mounted to survey carriage body 202, and may terminate with an adjustable junction section. Sweep-side section 206C of survey carriage swivel arm 206 may pivot on vertical sweep pivot post 214 of sweep bracket 220 mounted to rail sweep 1314 and may terminate with an adjustable junction section. Center section 206B of survey carriage swivel arm 206 may include a rigid portion, terminated at each end by an adjustable junction section. FIG. 6 also clearly shows the alignment of adjustable junction sections of carriage-side section 206A, center section 206B and sweep-side section 206C via the alignment of center holes 243, and the alignment of circumferential holes 245 with circumferential slots 247.

Figure 7:
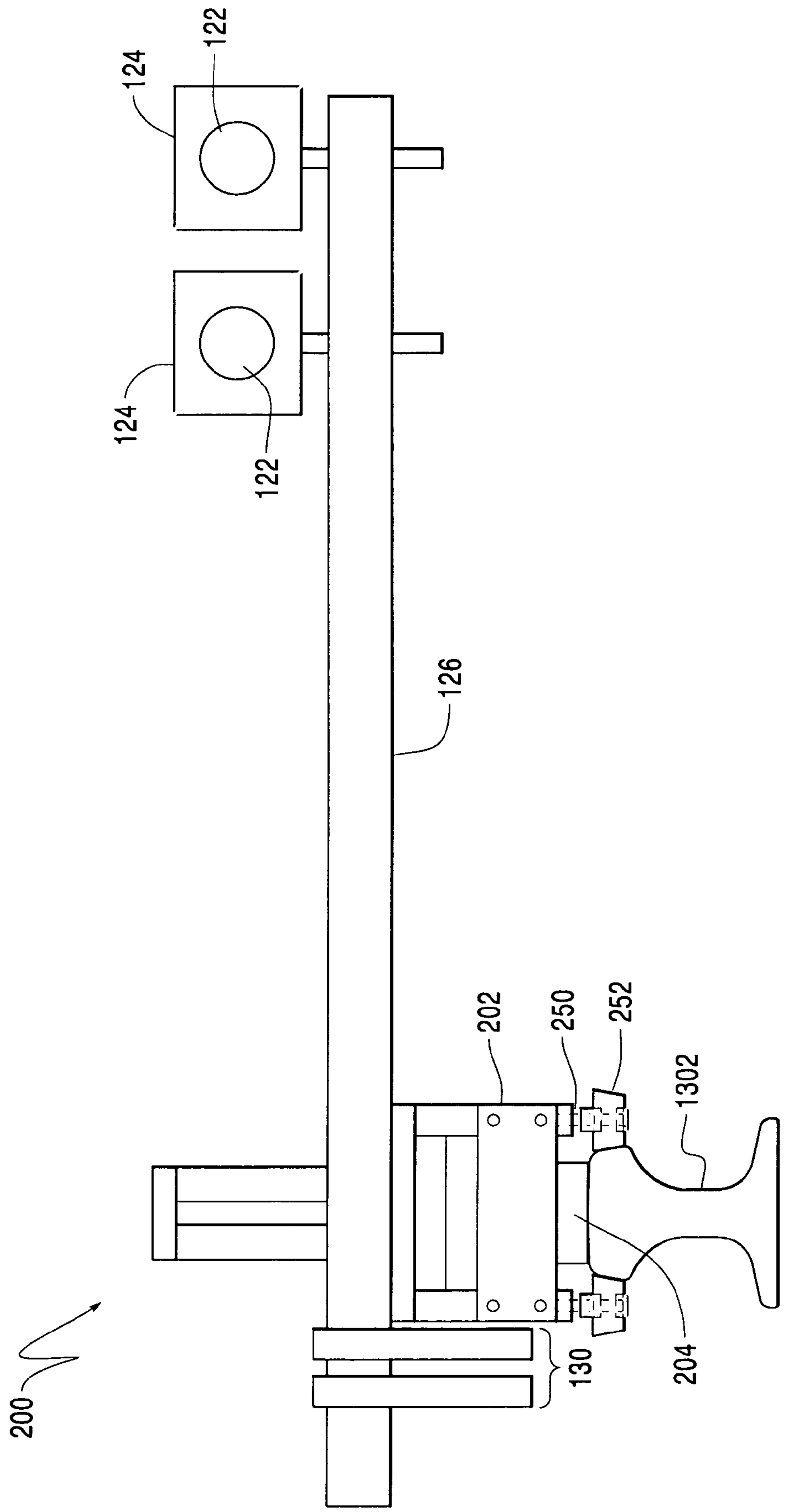
FIG. 7 is an end elevation view of the second exemplary rail survey carriage, shown in FIGS. 5 and 6, relative to a conventional crane rail.

FIG. 7 is an end elevation view of the second exemplary rail survey carriage 200, shown in FIGS. 5 and 6, relative to a crane rail 1302. FIG. 7 clearly shows that rail survey carriage 200 may include a single survey carriage wheel 204 that rides directly on top of, and does not straddle, crane rail 1302. FIG. 7 further shows rail survey carriage 200 may include a plurality of carriage stabilizing side-arms 250 each with a carriage stabilizing wheel 252. During operation, carriage stabilizing wheels 252, make tight contact with the side faces of crane rail 1302 to assure that survey carriage body 202 remains centered over the centerline of crane rail 1302.

Figure 8:
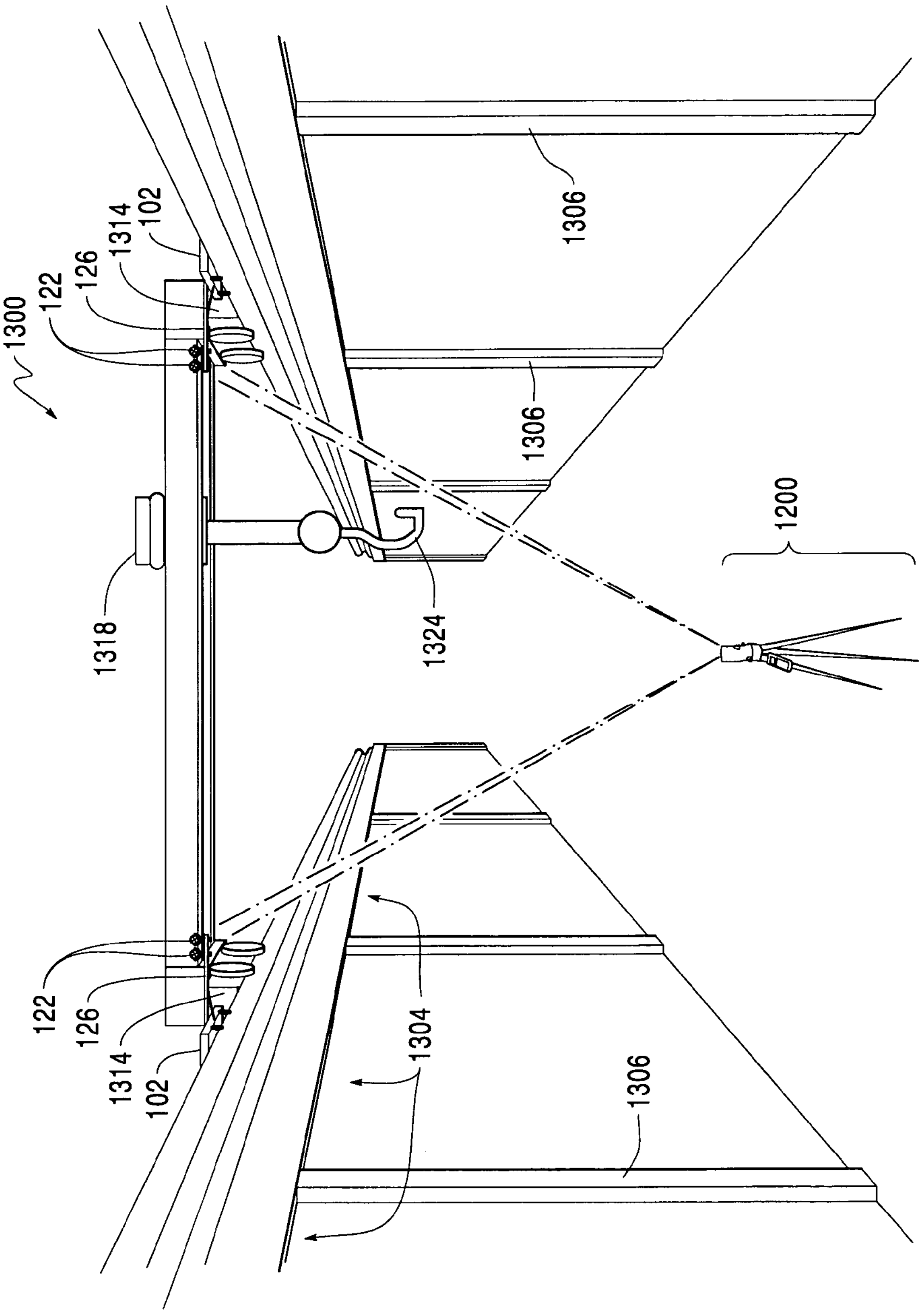
FIG. 8 is a ground view in schematic perspective of the disposition of an overhead crane, equipped with an exemplary rail survey carriage with respect to an exemplary electronic transit (ET)/electronic distance measuring (EDM) device, or ET/EDM device, commonly referred to as a total station, positioned at loading dock level.

FIG. 8 is a ground view in schematic perspective of the disposition of an overhead crane, equipped with an exemplary rail survey carriage with respect to an exemplary ET/EDM device positioned at loading dock level.

In FIG. 8, an overhead crane 1300 is equipped with two exemplary rail survey carriages (one rail survey carriage positioned on each crane rail 1302). As configured, each rail survey carriage may be selectively pushed or pulled in unison by respective rail sweeps 1314 along each of the respective crane rails (not shown) supported by each of cranes girders 1304.

Further, as shown in FIG. 8, each rail survey carriage includes a prism arm 126 mounted to survey carriage body 102 that extends in a direction generally perpendicular to the crane rail 1302 on which each of the respective rail survey carriages travel, and toward the opposite crane rail, into an area above the loading dock serviced by overhead crane 1300. Each prism arm 126 includes two prisms mounted side-by-side at the ends of prism arm 126 furthest away from the survey carriage body 102 to which each respective prism arm 126 is attached.

As demonstrated by the dashed lines from ET/EDM device 1200 to each of the respective prisms 122 shown in FIG. 8, an ET/EDM device located on the loading dock level has a clear view each of prisms 122. Further, as is made evident from the perspective view presented in FIG. 8, as overhead crane 1300 travels further away from ET/EDM device 1200, the ET/EDM device will continue to have a clear view of the respective prisms 122 at each and every position that overhead crane 1300 may stop along crane rails 1302.

The angles of the respective rail survey carriage prisms may be set to slightly different angles relative to the loading dock level to increase the likelihood that an ET/EDM device positioned at one or more central locations of the loading dock level will be able to obtain a sighting on at least one of the rail survey carriage prisms. Further, one or more prisms that support a large offset value (e.g., 40 mm) may be used. Such prisms are capable of reflecting a sufficiently strong signal back to an ET/EDM for the ET/EDM to obtain a reading, despite the prism receiving the signal from the ET/EDM at an angle that is up to 40 degrees off center, i.e., up to 40 degrees off perpendicular or up to 40 degrees off normal. Further, a prism may be set at a −40 mm true nodal point constant which offers optimal angle measurements, even when tilting the prism on either the horizontal or vertical axis.

Therefore, the ET/EDM device may take a reading of prisms 122 as the overhead crane 1300 selectively pushes and pulls the respective rail survey carriages along the respective crane rails 1302. In this manner, a single ET/EDM device may collect crane rail survey information while the overhead crane 1300 performs daily operations under a variety of workloads and conditions. Accurate rail survey position data may be collected with minimal interruption of normal crane activities. Further, since the respective rail survey carriages do not include sophisticated electronic equipment, such as laser devices, CCD cameras and radio transmitters, as are included in rail survey devices addressed above with respect to Waisanen and Pojda, the likelihood of technical problems that could result in disturbances to routine operation of overhead crane 1300 are greatly reduced.

Further, because the described rail survey carriages and related rail survey techniques may be performed under normal operating conditions, rail survey data is more likely to be collected on a routine basis and, therefore, is more likely to detect non-compliant rail alignment and span alignment conditions, and/or may be more available on a real-time basis to assist in detecting crane skew and the underlying problems causing the crane skew, such as improperly balanced drive motors and/or misaligned crane wheels.

Figure 9:
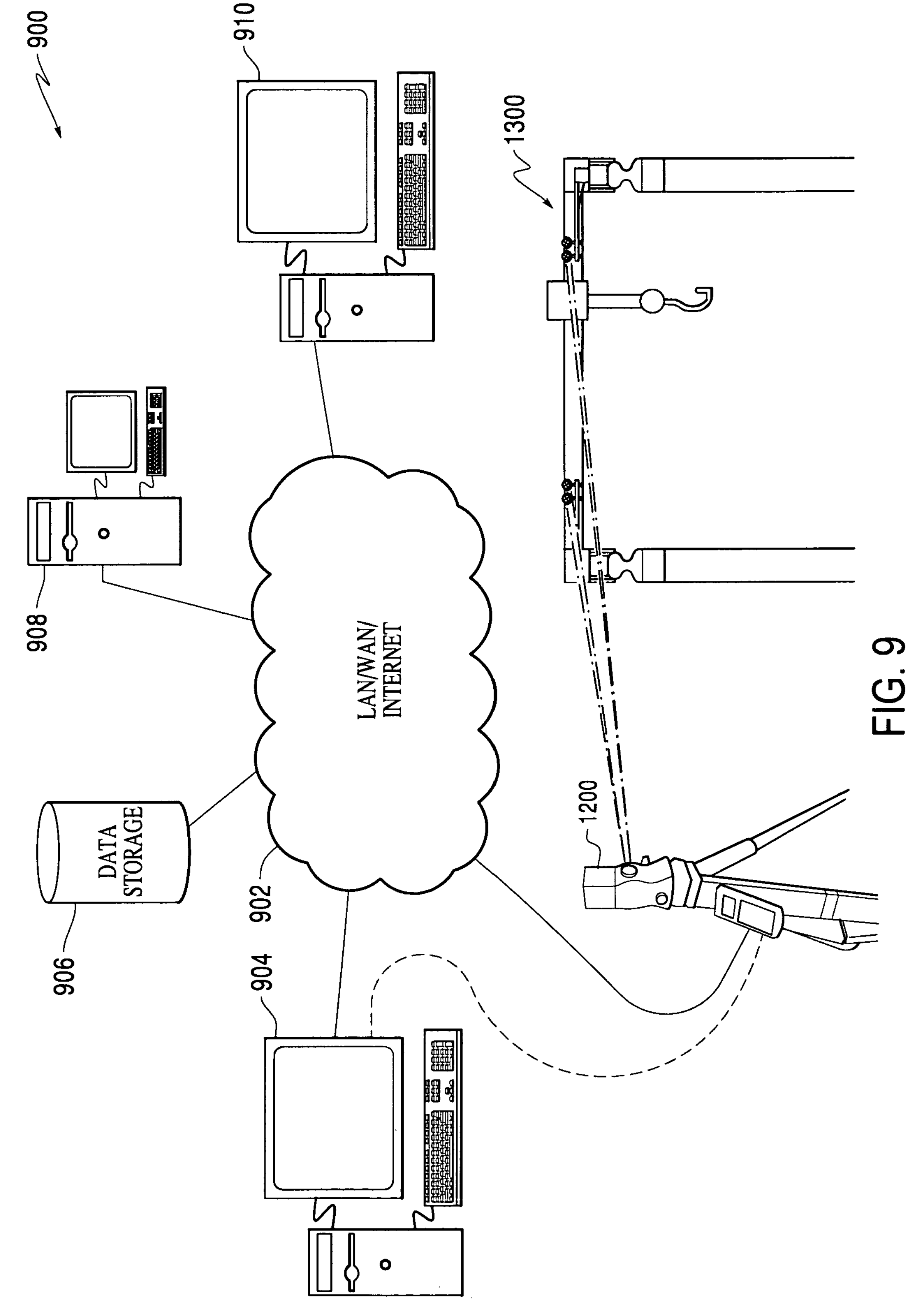
FIG. 9 is a schematic of an exemplary network that provides communication connectivity between an ET/EDM device, networked processors and workstations/controls manned by crane operating personnel.

FIG. 9 is a schematic of an exemplary network 900 that may provide communication connectivity between an ET/EDM device, network accessible data storage and processing resources and workstations/consoles manned by crane operating personnel. As shown in FIG. 9, such a network may include a Local Area Network/Wide Area Network/Internet Network 902 that supports data communication and data transfers between one or more survey workstations/consoles 904, one or more network data stores 906, one or more network accessible servers 908, and one or more crane operator workstations/consoles 910.

For example, as described above, an exemplary ET/EDM device 1200 may be capable of collecting and storing significant volumes of rail survey coordinate information. As shown in FIG. 9, such survey coordinate information may be transferred directly to a survey workstation computer 902 via, for example, and RS-232 serial cable connection, or, if the ET/EDM device 1200 is network compatible, survey coordinate information may be transferred directly from ET/EDM device 1200 via network 902.

Survey coordinate information may either be processed immediately, or stored, e.g., in a network accessible data store 906 accessible to network connected servers, for later processing. Such survey coordinate information may be processed by a survey workstation and/or a centralized server to, for example, assess rail alignment, assess rail elevation, assess rail span, assess crane skew, and/or to generate reports and/or alarms to crane operating/monitoring personnel via, for example, one or more network connected crane operator workstations/consoles 910, as a result of determining that applicable crane specification requirements have been exceeded.

Figure 10:
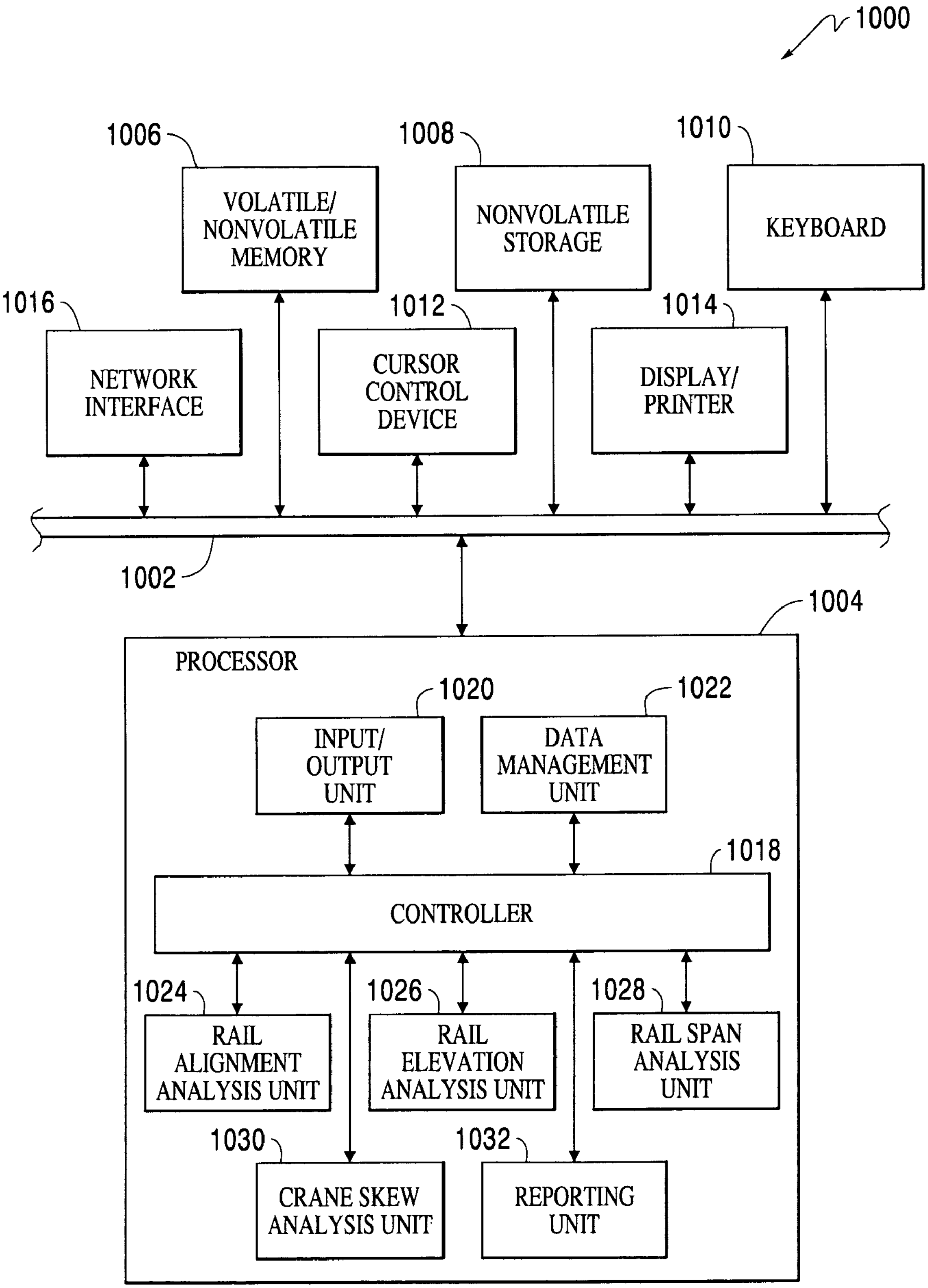
FIG. 10 is a schematic of an exemplary computer/processor that receives and processes rail survey data.

FIG. 10 is a schematic of an exemplary computer/processor that receives and processes rail survey data. For example, the features described below with respect to FIG. 10 may be integrated within one or more survey workstations/consoles 904, network accessible servers 908, and/or one or more crane operator workstations/consoles 910, described above with respect to FIG. 9.

As shown in FIG. 10, a computer 1000 used to receive and/or process rail survey coordinate information may include, a computer system data bus 1002 that allows a processor 1004 to communicate and exchange information with hardware components of the computer such as: volatile/nonvolatile memory 1006, which allows the processor 1004 to store program instructions in local memory for execution and to store and maintain temporary variables necessary for execution of the stored program instructions; nonvolatile storage 1008, which allows processor 1004 to access and retrieve larger bodies of data and program instructions for later execution by the processor; keyboard 1010, and/or a cursor control device 1012 that allows the processor to receive user instructions and/or information and/or feedback; network interface 1016 which allows processor 1004 to communicate and exchange information with computers and remote resources over a LAN/WAN/Internet network as described above with respect to FIG. 9; and display/printer 1014 which allows processor 1004 to format and present the results of analysis to a local and/or remote user of computer 1000.

As further shown in FIG. 10, processor 1004 may include internal components which allow the processor to communicate with the above-described hardware components to send and receive data and instructions over system bus 1002. Such components may include: a controller 1018 capable of communicating with and controlling an input/output unit that manages communication exchanges with the system bus 1002; and a data management unit, which allows the controller to maintain a local set of control parameters such as counters, pointers, and segments of executable program instructions currently under execution.

When provided with executable instructions for performing rail survey analysis, as described above, processor 1004 may, in accordance with instructions/commands received from a user, retrieve and initiate control parameters/pointers for the execution of program instructions related to use and analysis of rail survey data collected, as described above, using a rail survey carriage and ET/EDM device.

Therefore, when instructed by a user command to initiate rail survey analysis, as described above, processor 1004 may retrieve and load program instructions from nonvolatile storage 1008 into volatile/nonvolatile memory 1006 for execution and may maintain control parameters in data management unit 1022 for use in controlling the simultaneous and/or sequential execution of the program instructions retrieved for execution.

In this manner, upon receiving instructions to perform rail survey analysis in support of the above-described approach, processor 1004 may establish, based on stored program instructions retrieved for execution from nonvolatile storage 1008, such as a hard-drive and/or firmware storage: a rail alignment analysis unit 1024 that retrieves and processes stored rail survey coordinates for use in determining a rail path contour of an overhead crane rail based on a set of rail survey coordinates for a single rail; a rail elevation analysis unit 1026 that retrieves and processes stored rail survey coordinates for use in determining an elevation contour of an overhead crane rail based on a set of rail survey coordinates for a single rail; a rail span analysis unit 1028 that retrieves and processes stored rail survey coordinates for use in determining a rail span contour of two parallel overhead crane rails based on rail survey coordinates for a pair of rails; a crane skew analysis unit 1030 that retrieves and processes stored rail survey coordinates for use in determining a skew of an overhead crane based on an analysis of rail survey coordinates for a pair of rails, in which survey coordinate data is analyzed to determine the location of forward edges and, hence, a skew in the forward edges of cranes sweeps traveling along each of the respective overhead crane rails; and a reporting unit 1032 that generates reports and/or alarms based on the results generated by each of the units described above and/or a comparison of the respective result with stored threshold parameters.

Figure 11:
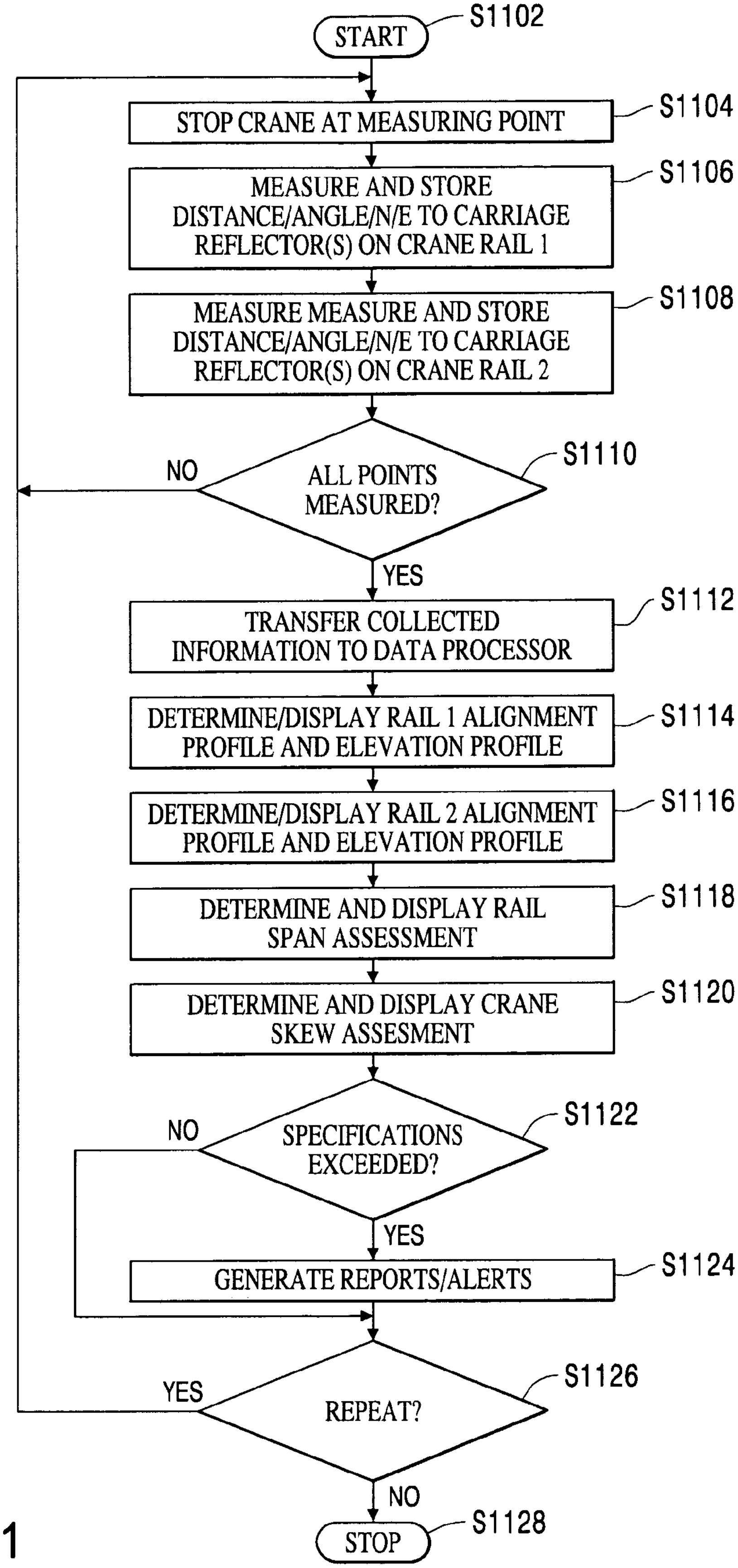
FIG. 11 is a flow diagram representing exemplary methods of performing a rail survey using information collected using an ET/EDM and exemplary embodiments of the described rail survey carriage.

FIG. 11 is a flow diagram representing exemplary methods of performing a rail survey using information collected using an ET/EDM and exemplary embodiments of the described rail survey carriage described above. In the process described below, it is assumed that at least two rail survey carriages are mounted to the overhead crane being surveyed and that at least one prism on each rail survey carriage is visible to a ET/EDM device for sighting purposes at each crane stop position.

As shown in FIG. 11, operation of the method begins at step S1102 and proceeds to step S1104.

In step S1104, an overhead crane is stopped in a position along the crane rail, operation of the method continues to step S1106.

In step S1106, an ET/EDM, may be used to measure the distance, angle of elevation with respect to the horizon and angle of rotation with respect to a fixed angle from the ET/EDM location to one or more prisms attached to a first rail survey carriage attached to a rail sweep on a first crane rail. The information may be stored as raw collected data or processed to determine 3-D coordinate data for the location of each reflector. Once the raw and/or 3-D coordinate data is stored, operation of the method continues to step S1108.

In step S1108, an ET/EDM, may be used to measure the distance, angle of elevation with respect to the horizon and angle of rotation with respect to a fixed angle from the ET/EDM location to one or more prisms attached to a second rail survey carriage attached to a rail sweep on a second crane rail. The information may be stored as raw collected data or processed to determine 3-D coordinate data for the location of each reflector. Once the raw and/or 3-D coordinate data is stored, operation of the method continues to step S1110.

If, in step 1110, survey data has been collected for all the desired stopping points along each of rail 1 and rail 2, operation of the method continues to step S1112, otherwise, the method returns to step 1104 to collect rail survey data for additional overhead crane stopping points.

In step S1112, rail survey data collected and stored within the ET/EDM is transferred via a direct connection or via a LAN/WAN/Internet connection to a rail survey workstation or other computer for storage and/or further processing, and operation of the method continues to step S1114.

In step S1114, collected rail survey data is processed by a survey processor, similar to the survey processor described above with respect to FIGS. 9 and 10, and a rail alignment profile and rail elevation profile is developed for rail 1 which may be optionally displayed to the user, and operation of the method continues to step S1116.

In step S1116, collected rail survey data is processed by a survey processor, similar to the survey processor described above with respect to FIGS. 9 and 10, and a rail alignment profile and rail elevation profile is developed for rail 2 which may be optionally displayed, and operation of the method continues to step S1118.

In step S1118, collected rail survey data is processed by a survey processor, similar to the survey processor described above with respect to FIGS. 9 and 10, and a rail span assessment is developed based on the rail alignment and rail elevation profiles prepared for rail 1 and rail 2, which may be optionally displayed, and operation of the method continues to step S1120.

In step S1120, collected rail survey data collected for each of rails 1 and 2 is processed by a survey processor, similar to the survey processor described above with respect to FIGS. 9 and 10, and a crane skew assessment is developed, which may be optionally displayed, and operation of the method continues to step S1122.

If, in step S1122, it is determined that specification-based threshold values associated with any of the determined rail alignment, rail elevation, rail span and/or crane skew profiles have been exceeded, operation of the method continues to step S1124, otherwise operation of the method continues to step S1126.

In step S1124, reports and/or alerts are generated based the specification-based threshold values that have been exceeded. Based on the nature of the thresholds exceeded, the generated reports and/or alerts may be automatically and/or manually transmitted via a LAN/WAN/Internet connected survey processor, similar to the survey processor described above with respect to FIGS. 9 and 10, to a plurality of locations, such as crane survey personnel workstations, and/or crane operator workstations/consoles, and operation of the method continues to step S1126.

If, in step S1126, it is determined that further rail survey data and analysis is required, operation of the method continues to step S1104, otherwise the method terminates at step S1128.

A third exemplary embodiment of a rail survey carriage, includes a rectangular carriage unit that is roughly 36" in length, 6" in width, 6" in height. Underneath the unit, two sets of horizontally opposing removable wheels depend, each being shaped to the contour of the railhead on which the unit carriage rides.

There are different sizes of rail in use today with three being the most common. Each selected size may require its respective wheel set, wherein the wheels therein keep the survey unit centered over the crane rail, as described above. One removable arm only in this unit protrudes toward the center of the crane bay. At the end of that arm may be fixed one or more prisms. The angles of the respective prisms may be set to different angles relative to the loading dock level in order to increase a likelihood that an ET/EDM device positioned at one or more central locations of the loading dock level will be able to sight on at least one of the prisms during the rail survey data collection process. Opposite this arm are one or more moveable counterweights such as will bring the center of gravity of the unit to the center of the rail under survey.

In operation, the survey carriage unit is alternately pulled or pushed by the crane along its rail; thus, the survey unit may be attached to the rail sweep at the leading edge of the four corners of the crane. The attachment may allow for swivel both vertically and horizontally, but not for tilt, thereby ensuring that the unit remains plumb with the ground. At the top of the unit may be a safety harness that is looped around the crane stop bumper.

As observed from the ground, as the crane approaches, two of the survey units will be visible and after it passes the other two units will be visible. In controlled operation, the crane stops at pre-selected intervals; for example, where and when such units are near a support column and each prism on both sides is sighted with an ET/EDM, which may be commonly referred to as a total station, whereupon the crane may move on to the next pre-selected stopping point interval and the process may be repeated.

Features and benefits of the described rail survey carriage and overhead crane rail survey method include: a) the ability to adapt the wheels of the rail survey carriage to support a wide range of different sized crane rails; b) the survey carriage swivel arm ensures that side-to-side movement of the crane does not adversely affect the position of a rail survey carriage relative the crane rail; c) the ability to have multiple prisms, each set to a slightly different angle relative to the loading dock floor, reduces the need for manual or mechanized repositioning of rail survey carriage prisms during the rail survey process; d) a safety cable is provided in case of obstruction or rail survey carriage derailment; e) the approach exposes overhead crane rail survey personnel to less risk of personal injury during the rail survey process; f) the approach allows rail survey data to be collected without interrupting the normal operation of the overhead crane, and therefore increases access to rail survey data for use in a wide range of maintenance and/or preventive maintenance operations that would benefit from knowledge of rail, span and elevation profiles as well as crane skew tendencies.

A third exemplary rail survey carriage may be made of metal, rests on the crane rail and supports two prisms, for example, an Eclipse −40 mm Offset Tilting Prism, produced by Seco Manufacturing Company, each prism being mounted on an end of a rail survey carriage prism arm. The prism arm may be disposed perpendicular to the device and may project the prisms inward to the center of the bay being surveyed. The rail survey carriage may also include a survey carriage swivel arm that is attached to a rail sweep of the overhead crane with enough play for the device to follow the contour of the rail through anticipated side-to-side drifting of the crane. This pivot arm may take into account, i.e., may compensate for a typical ¾ inches drift on either side of the crane wheels' center.

On the ground, an operator may use an EDM equipped total station, e.g., a portable ET/EDM produced by manufacturers such as Topcon, Sokkia, Wild with a data collector known as Husky, Recon, TDS, connected to an RCS 232 data port, standard on all modern total stations. The crane may be stopped at various points, for example, at every crane column or more and measurements may be taken as an XYZ coordinate for storage, stored in a data collector. This process may be repeated until a measurement has been collected at every pre-selected survey point desired. Data may then be downloaded into one or more of a CAD program, e.g., AutoCAD by AutoDesk, and a survey specific add-on program, e.g., RAMMS Party Chief. The latter uses a least squares method to find a best-fit line for a collection of points. This information may then manipulated to generate an as-built survey, or profile, of the existing rail geometry in the critical areas of span, straightness and elevation. Concurrently, crane skew data may also be provided for each point of measurement. The rail survey carriage may be attached on 2 or 4 of the corners of the overhead crane, depending on the requirements of the survey.

It will be appreciated that the embodiments described above and illustrated in the drawings represent only a few of the many ways of collecting and analyzing rail survey data. The described methods and apparatus are not limited to the specific embodiments described herein, but include any apparatus and method for the collection of overhead crane rail survey data that includes use of a rail survey carriage that is selectively pushed or pulled by the rail sweep of an overhead crane.

From the foregoing description it will be appreciated that the present invention includes novel apparatus and methods for collecting, storing and processing overhead crane rail survey data.

Although the sighting target described in the above exemplary embodiments is a reflective prism, a sighting target may be any device that supports a survey sighting of a position marked with the sighting target. For example, the sighting target could be a marker of any sort that supports a survey sighting, such a colored mark, a high contrast grid or scale, or other marking that would support a survey sighting with an ET/EDM or other survey instrument.

For example, in other embodiments, the sighting targets may include one or more transmitters, transceivers or reflectors that emit, repeat or reflect an electromagnetic signal, thereby allowing a precise location of a sighting target to be determined using a plurality of receivers at known locations. For example, each of a plurality of receivers at known locations may be configured to receive an electromagnetic signal that is emitted, repeated or reflected from a sighting target. Each receiver may process the received signal to determine a precise distance from the sighting target to each respective receiver. Once a precise distance from a sighting target to each receiver is determined, a precise location of the sighting target may be determined, using trigonometric calculations, based on the known positions of the respective receivers and the determined distance between each of the receivers and the sighting target. For example, using such techniques, the precise location of a sighting target may be determined in three-dimensional space using as few as four receivers. Additional receivers may further increase the accuracy and precision of the determined sighting target location, and/or may allow for a minimum of four receivers to receive a signal emitted, repeated or reflected from a sighting target when one or more of the receivers is in a location that is blocked from receiving the emitted, repeated or reflected signal from a specific sighting target.

Although embodiments of the crane rail survey carriages described above include wheels that allow the rail survey carriages to ride on, and/or to stay aligned with, an overhead crane rail, in other embodiments, one or more of these wheels may be replaced with skids and/or any combination of wheels and skids, to allow the rail survey carriages to ride on, and to stay aligned with, an overhead crane rail.

Although the ET/EDM devices described in the above exemplary embodiments are generally portable, ET/EDM devices used in performing the above-described processes may also include fixed, or non-portable devices.

Having described preferred embodiments of the rail survey carriage and methods for collecting and processing rail survey date based on the used of the described rail survey carriage, it is believed that various modifications, improvements, substitutes or the like will be suggested to those skilled in the art in view of the teachings set forth herein. It is therefore to be understood that all such modifications, improvements, substitutes and the like are believed to fall within the scope of the present invention. Although specific terms are employed herein, they are used in their ordinary and accustomed manner only, unless defined differently herein, and not for purposes of limitation.

What is claimed is:

1. A crane rail survey carriage in driven relationship with a rail sweep of an overhead crane, the crane rail survey carriage comprising:

- a survey carriage body;
- a first plurality of wheels connected to the survey carriage body that allow the survey carriage body to ride on a crane rail of the overhead crane;
- at least one sighting target supported by the survey carriage body; and
- a driving arm configured for connecting the survey carriage body to the rail sweep of the overhead crane,
- wherein the crane rail survey carriage is selectively pushed or pulled along the crane rail by the rail sweep via the driving arm.

2. The crane rail survey carriage of claim 1, wherein the first plurality of wheels conform to a contour of a first surface of the crane rail.

3. The crane rail survey carriage of claim 1, further comprising:

- a second plurality of wheels connected to the survey carriage body that contact a second surface of the crane rail.

4. The crane rail survey carriage of claim 1, wherein the driving arm includes a hinged connection to the survey carriage body.

5. The crane rail survey carriage of claim 1, wherein the driving arm includes a hinged connection to the rail sweep.

6. The crane rail survey carriage of claim 1, wherein the driving arm further includes an adjustable joint that may be rigidly fixed at a selected angle.

7. The crane rail survey carriage of claim 1, further comprising an arm that extends from the survey carriage body and supports the at least one sighting target at a known offset relative to a centerline of the crane rail.

8. The crane rail survey carriage of claim 7, wherein the sighting target is a prism.

9. The crane rail survey carriage of claim 7, wherein the at least one sighting target comprises at least two sighting targets and the arm supports the at least two sighting targets.

10. The crane rail survey carriage of claim 9, wherein the sighting targets are prisms, each prism adjustable to a different angle relative to a position from which a survey sighting may be made.

11. A method for assessing a rail alignment of an overhead crane, comprising:

- attaching a rail survey carriage to a rail of the overhead crane in driven relationship with a rail sweep of the overhead crane;
- periodically stopping the overhead crane at positions along the rail;
- measuring a position of at least one sighting target supported by the rail survey carriage;
- storing sighting target position information measured for a plurality of overhead crane stops; and processing the stored sighting target position information to determine an alignment of the rail.

12. The method of claim 11, wherein the at least one sighting target is supported by an arm that extends from the rail survey carriage and supports the at least one sighting target at a known offset relative to a centerline of the rail.

13. The method of claim 12, wherein the at least one sighting target is a prism.

14. The method of claim 12, wherein the at least one sighting target comprises at least two sighting targets and the arm supports the at least two sighting targets.

15. The method of claim 14, wherein the sighting targets are prisms, each prism adjustable to a different angle relative to a position from which a survey sighting is made.

16. The method of claim 11, wherein measuring a position of a sighting target further comprises:

sighting the sighting target with a total station.

17. The method of claim 11, wherein storing sighting target position information for a plurality of overhead crane stops, further comprises:

transferring the target position information collected for at least one overhead crane to at least one of a processing computer and a data storage device.

18. The method of claim 11, further comprising:

processing the stored sighting target position information to generate an elevation profile of the rail.

19. The method of claim 11, wherein measuring a position of a sighting target further comprises:

measuring positions of sighting targets on two rail survey carriages, each rail survey carriage attached to a separate rail of two substantially parallel rails of the overhead crane.

20. The method of claim 19, further comprising:

processing the stored sighting target position information to identify a skew in the alignment of the overhead crane on the crane rails.

21. The method of claim 19, further comprising:

processing the stored sighting target position information to generate a profile of a span between the two rails.

22. A method for identifying a skew in the alignment of an overhead crane, comprising:

attaching a rail survey carriage to each of two substantially parallel rails of the overhead crane, each rail survey carriage in driven relationship with a rail sweep of the overhead crane;

stopping the overhead crane at a position along the rail;

measuring a position of a sighting target on each of the rail survey carriages; and processing the sighting target position information to identify a skew in the alignment of the overhead crane on the rails.

* * * * *